J. F. ANDERSON.
PIPE COUPLING.
APPLICATION FILED JULY 27, 1917.
1,275,118.
Patented Aug. 6, 1918.
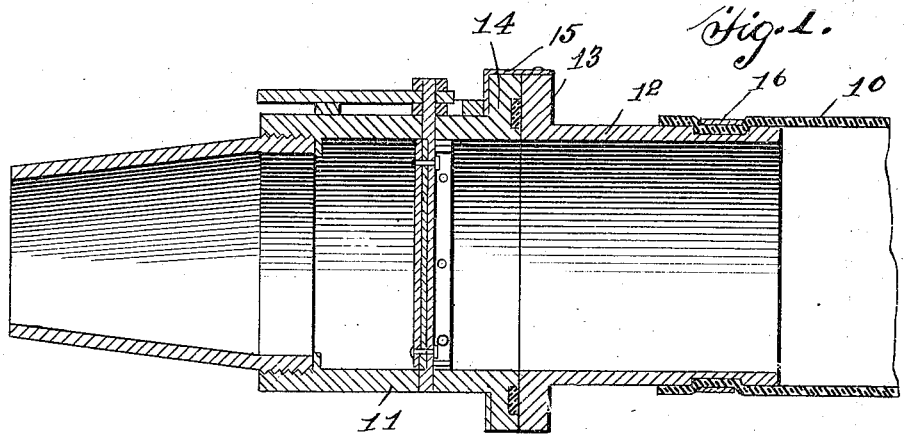
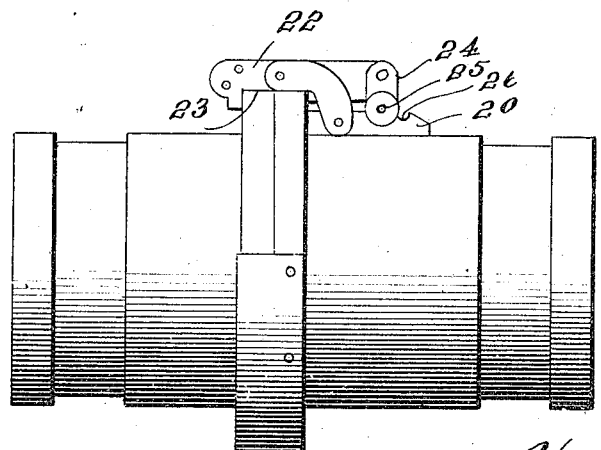
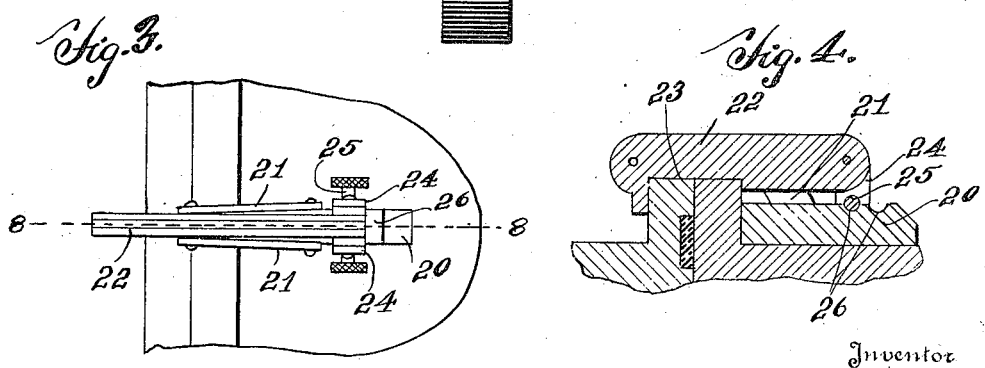
Inventor
J. F. Anderson

UNITED STATES PATENT OFFICE.

JOHN F. ANDERSON, OF NORWAY, IOWA.

PIPE-COUPLING.

1,275,118.

Specification of Letters Patent.

Patented Aug. 6, 1918.

Application filed July 27, 1917. Serial No. 183,153.

*To all whom it may concern:*

Be it known that I, JOHN F. ANDERSON, a citizen of the United States, residing at Norway, in the county of Benton, State of Iowa, have invented certain new and useful Improvements in Pipe-Couplings; and I do hereby declare the following to be a full, clear, and exact description of the invention, such as will enable others skilled in the art to which it appertains to make and use the same.

This invention relates to new and useful improvements in pipe couplings and particularly to devices for attaching nozzles to hoses.

One object of the present invention is to provide a device of this character which is simple in construction, effective in its operation, and which can be quickly and easily coupled or uncoupled.

Another object is to provide a coupling which is capable of use in connection with nozzles and with ordinary hose ends whereby a firm and effective joint is produced.

Another object is to provide a novel locking means for the coupling.

Other objects and advantages will be apparent from the following description when taken in connection with the accompanying drawing.

In the drawings:

Figure 1 is a vertical longitudinal sectional view through a nozzle and hose showing a portion of the coupling therefor.

Fig. 2 is an elevation of a pair of coupling members for connecting two hose ends together, and showing the locking device therefor.

Fig. 3 is a top plan view of the coupling locking device.

Fig. 4 is an enlarged vertical sectional view on the line 8—8 of Fig. 3.

Referring particularly to the accompanying drawing 10 represents a hose end which is coupled to a nozzle 11 by means of my improved coupling device. Disposed in the hose end is a sleeve 12 the outer end of which is formed with an outwardly extending peripheral flange 13. The nozzle 11 has a similar flange 14 on its inner end which is disposed in abutting relation to the flange of the sleeve. The flange of the sleeve is provided with a longitudinally extending and inwardly turned lip 15 which is arranged to engage over and embrace a portion of the flange of the nozzle. This lip 15 extends around the flange 13 to an extent slightly less than one-half of the circumference of the flange, so that the flange of the nozzle can be readily slipped in under the lip and removed therefrom. A metal band 16 is engaged around the hose end, to clamp the same on the sleeve 12.

Mounted on one side of the sleeve 12 is a longitudinally extending member 20, and pivotally connected to the end of this member, adjacent the flange of the sleeve, is a pair of links 21. Pivotally mounted between these links is a member 22, the inner longer edge of which is formed with a notch or recess which is of such dimensions as to snugly receive adjacent portions of the flanges of the sleeve and nozzle, as at 23. Pivotally connected to the other end of the member 22 are the short links 24 which are connected by a transverse bolt 25, said bolt being arranged to engage in one or another of a series of notches 26 formed in the adjacent end of the upper or outer edge of the member 20. Thus when the member 22 is swung into position to grip the flanges, the links 24 are swung downwardly so that the bolt 25 will snap into one of the notches 26, and thereby hold the parts in firm gripping engagement with the flanges of the sleeve and nozzle.

As clearly seen in Fig. 2 the device is adapted for connecting two hose ends.

What is claimed is:

1. A hose coupling including a pair of members having peripheral abutting flanges, a notched member pivotally carried by one of the said members and arranged to straddle said flanges, a stationary notched member carried by said last-named member, and a pivoted locking means carried by the rear end of the pivoted notched member for engagement with the stationary notched member to hold the pivoted member in locking position with the said flanges in engaging position.

2. A hose coupling including a pair of members formed with abutting flanges, a pivoted member carried by one of the members and formed with a notch for the reception of the said flanges, a notched member mounted adjacent said pivoted member, and a locking means carried by the pivoted member for engagement in said notches.

In testimony whereof, I affix my signature in the presence of two witnesses.

JOHN F. ANDERSON.

Witnesses:
 GEO. A. DOEBEL,
 CHAS. W. CHAELED.